(12) United States Patent
Cucinotta

(10) Patent No.: US 7,516,882 B2
(45) Date of Patent: Apr. 14, 2009

(54) REMOTE VALIDATION SYSTEM USEFUL FOR FINANCIAL TRANSACTIONS

(76) Inventor: Robert Cucinotta, 643 River Oaks Pkwy., San Jose, CA (US) 95134

( * ) Notice: Subject to any disclaimer, the term of this patent is extended or adjusted under 35 U.S.C. 154(b) by 146 days.

(21) Appl. No.: 11/371,844

(22) Filed: Mar. 9, 2006

(65) Prior Publication Data

US 2007/0210148 A1  Sep. 13, 2007

(51) Int. Cl.
*G06F 17/60* (2006.01)
(52) U.S. Cl. .................. 235/379; 235/380
(58) Field of Classification Search ............ 235/379, 235/380, 381, 39, 40, 41, 44; 705/39, 40, 705/41, 44
See application file for complete search history.

(56) References Cited

U.S. PATENT DOCUMENTS

| | | | | |
|---|---|---|---|---|
| 5,010,485 | A * | 4/1991 | Bigari ..................... | 705/17 |
| 6,679,775 | B1 * | 1/2004 | Luciano et al. ............ | 463/25 |
| 6,999,569 | B2 * | 2/2006 | Risafi et al. ............ | 379/144.01 |
| 2004/0007618 | A1 * | 1/2004 | Oram et al. ............... | 235/380 |
| 2005/0086168 | A1 * | 4/2005 | Alvarez et al. ............. | 705/41 |
| 2005/0269415 | A1 * | 12/2005 | Licciardello et al. ....... | 235/493 |

* cited by examiner

*Primary Examiner*—Daniel St. Cyr
(74) *Attorney, Agent, or Firm*—Townsend and Townsend and Crew LLP

(57) ABSTRACT

A financial services and transaction network including multiple networked validation stations and remote terminals allows users to access a number of financial services and transactions. A user visiting a remote terminal indicates a desired service or transaction. The user provides any currency or funding information needed for the selected service, after which the remote terminal issues the user a transaction voucher. The user can take this transaction voucher to any of the validation stations in order to authenticate the user's identity and activate the voucher. Once the voucher is activated, the user or a recipient of the voucher can present the voucher at any remote terminal to receive funding or otherwise complete the transaction or service, subject to recipient authentication. The user provides necessary information using the remote terminal or validation station, or supplies the information using the voucher, which is collected upon performance of the requested service or transaction.

27 Claims, 5 Drawing Sheets

REMOTE VALIDATION SYSTEM USEFUL FOR FINANCIAL TRANSACTIONS

BACKGROUND OF THE INVENTION

There are a variety of financial-based transactions and services available to users at various locations, including services such as the wiring of funds, cashing of checks, cash access from credit cards, ATM cards, online and offline debit cards, and many others. Oftentimes, the fee for these services may be prohibitive for certain users, where the fee is a percentage of the amount of the transaction or a minimum amount. Further, there may be restricted access to the funds. If, for example, a user wishes to send money to a person in another part of the country, or even another part of the world, the user may have to physically mail cash funds to the other person, which can be undesirable for many reasons, or wire the money to the person, which requires that person to have easy access to a location where the wired funds can be received. Further, it is required that this location be open for business when the intended recipient arrives.

Other transactions exist where the fees or procedure may not be prohibitive, but may simply be inconvenient. For example, a user acquiring a substantial amount of cash may not wish to carry the cash around. Unless the user has access to a bank, or is willing to deposit the funds into an ATM (which may not provide access to those funds for a period of time), the user may have no choice but to carry the cash around or place the cash in a location such as a hotel room or glove compartment. In some cases the user may need access to the funds to pay someone, for example, but still would prefer not to have to carry cash. If there is no bank or place for obtaining a money order that is convenient, if it is after hours, or if the user does not know to whom to address the money order, for example, there may be no viable option other than carrying the large amount of cash. Further still, even if the user actually gives the other person the cash, there may be no proof that the funds were actually transferred.

In other cases, a user desiring a financial service must have a PIN number or other identifier to access the service. In some instances, it is difficult or at least inconvenient for a user to have to remember multiple PIN numbers, passwords, etc. Further, a PIN number typically requires a user to have an account with an existing financial institution, which for a number of reasons may be difficult for many potential users.

Another problem with obtaining financial services using existing institutions is that locations such as cash advance centers carry a lot of cash, and typically are in areas that have relatively high crime rates. This can present an undesirable situation for many users, as these institutions themselves are prone to robberies and theft due to the amount of cash on the premises. Such problems prevent many merchants and others from offering these financial services, due to the need for security, bullet proof glass, etc.

It therefore is desirable to provide a flexible system providing a variety of financial transactions and other such services that charges relatively low and/or affordable fees.

It also is desirable to provide convenient and 24 hour access to a variety of financial transactions and other such services using common elements such as cash, checks, driver's licenses, credit cards, ID cards, and other such elements.

It also is desirable to provide locations where cash is not processed, but financial services are processed using paper, cards, or electronic information, for example, which are less likely to be targets for robbery, etc.

BRIEF SUMMARY OF THE INVENTION

Systems and methods in accordance with various embodiments of the present invention can provide various financial services and can support various transactions utilizing a network comprising a plurality of remote terminals and validation stations.

In one embodiment, a system for providing financial services includes at least one remote terminal operable to accept a form of payment, or source of funding, and a financial service request from a user. The remote terminal then can issue a voucher and/or a voucher identifier to the user. A voucher and a voucher identifier each can take any of a number of forms, as discussed elsewhere herein. The user can take the voucher and/or voucher identifier to a validation station, where the user's identity can be authenticated. The validation station then can the voucher and/or voucher identifier for the authenticated user. This can involve presenting the user with the same voucher and/or voucher identifier, a new voucher and/or voucher identifier, a receipt, or any other form discussed herein. If a source of funding and selection of financial service have also been selected, the validated voucher can be activated, allowing the user or a recipient of the activated voucher to redeem the voucher using the voucher and/or voucher identifier. A voucher that did not previously contain a voucher identifier can have a voucher identifier associated therewith upon validation and/or activation. An activated voucher or voucher identifier can be used at any remote terminal, or any validation station, to obtain the requested financial service. Identity data can be collected for the user, or a recipient, such as by inputting data at the validation station, remote terminal, through the Internet, or by any other appropriate approach. Identity information also can be collected by accepting a voucher containing the information at a remote terminal or validation station, or otherwise accessing the information using any of a number of approaches as discussed elsewhere herein.

In one embodiment, a user provides a form of payment and an indication of a financial service to be provided at a first location. The user then is issued a transaction voucher corresponding to the requested financial service. The transaction voucher can include a voucher identifier. The user then can take the voucher and/or voucher identifier to a second location, where the identity of the user can be authenticated. A transaction voucher then can be activated at the second location for the authenticated user. If the transaction voucher did not previously have a voucher identifier, a voucher identifier can be assigned, attached, printed on, or otherwise associated with the voucher as described herein. An activated voucher can be used at the first location or any of a plurality of other locations to obtain the requested financial service.

In another embodiment, user goes to a first location, such as a validation station, where the identity of the user can be authenticated. An authenticated user can be issued a transaction voucher and/or a voucher identifier. The authenticated user can go to a second location where the user can provide a form of payment, an indication of a financial service to be provided, and the voucher and/or voucher identifier. The user then can be issued an activated transaction voucher and/or identifier corresponding to the requested financial service, a voucher having a voucher identifier associated therewith. The activated transaction voucher can be the original activated voucher or a new voucher. This activated voucher and/or identifier can be used at the second location or any of a plurality of other locations to obtain the requested financial service.

Other embodiments will be obvious to one of ordinary skill in the art in light of the description and figures contained herein.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments of the present invention can overcome these and other deficiencies in existing financial service and transaction systems and networks by utilizing a simple, flexible system providing access to any of a plurality of services without the need for a pre-existing account or application process. Such systems can utilize a number of remote terminals in a variety of convenient locations in order to provide easy access for a wide variety of users. A system in accordance with one embodiment is voucher-based, as will be described in further detail below, which allows a wide variety of financial services to be provided via a simple voucher-based approach.

As used herein, the term "transaction voucher" or "voucher" is meant to refer to any form, object or indicia of value, credit against future purchases, services, or expenditures, identity, or other information that can be used to allow a validation station to determine the type and/or amount of a requested service or transaction and obtain any information associated therewith. A voucher can take any of a number of various forms, including but not limited to:

- a paper voucher, which can have data, bar codes, or other (or no) indicia or information printed thereon
- a token
- a smart card
- a magnetic device
- a punch card
- a key
- a contactless or touchless card
- an infrared (IR) device
- an electronic processing device
- a wireless device
- a memory stick, memory card, memory chip, or other portable memory device or element
- a data chip
- a check
- a draft
- a magnetic striped card
- a credit card
- a debit card (online or offline)
- an ATM card
- a card having a bar code thereon
- a ticket
- a receipt
- any other object, element, device, system, or apparatus capable of being issued to a user at a remote terminal or validation station to indicate or be associated with information for a requested financial service or transaction.

Figure 1:
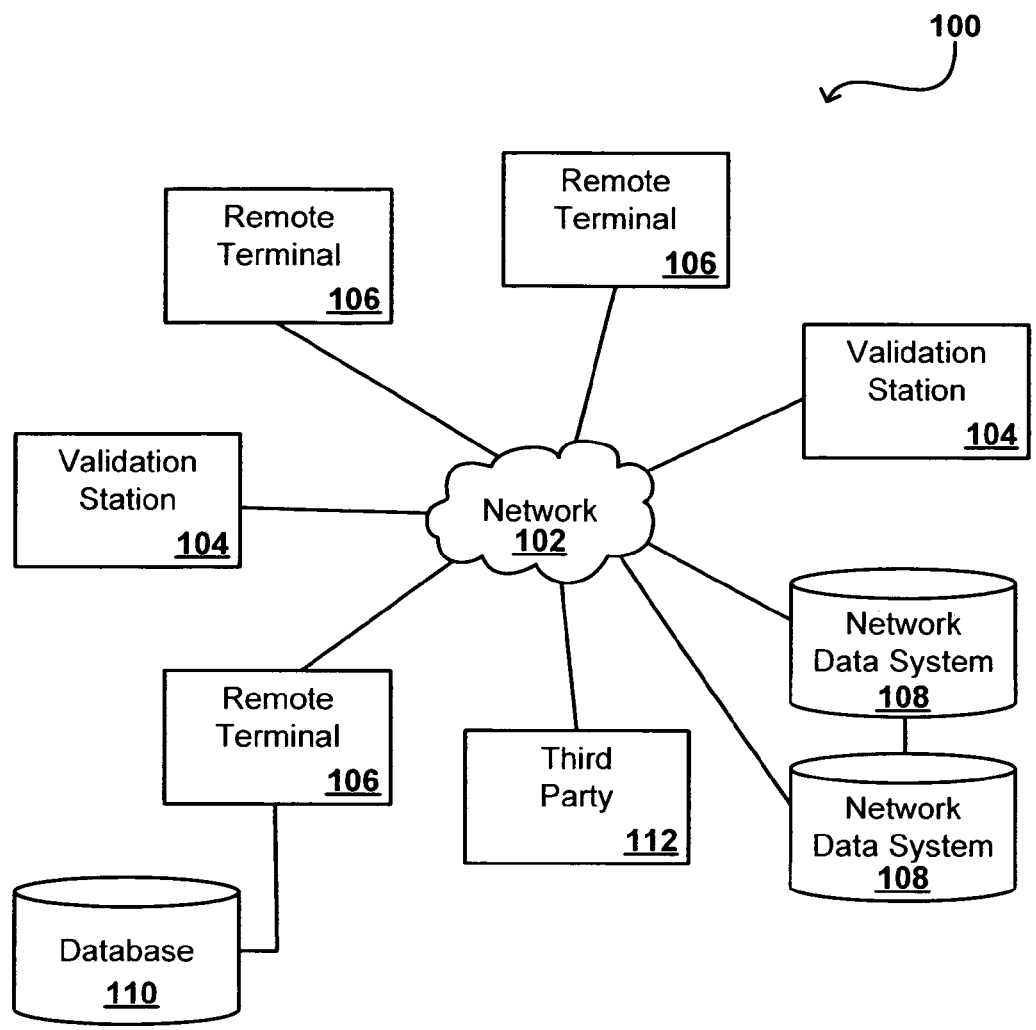
FIG. 1 illustrates a financial network including various components in accordance with one embodiment of the present invention.

FIG. 1 illustrates components of an exemplary financial services provider system 100 in accordance with one embodiment of the present invention. This system is based around an appropriate network 102 that may include Internet, intranet, extranet, or any of a variety of network or communication protocols capable of linking devices and transferring information as known in the art. The network can be used to provide a plurality of access points, as well as to link a plurality of components, such as a plurality of validation stations 104, a plurality of remote terminals 106, and a network data system 108, which as is known in the art can include devices such as databases, storage systems, database management systems, and any of a number of other data storage systems and data storage devices known or used in the art. In one embodiment, an interconnected dual data system including two mirrored databases used to redundantly hold all appropriate data for the financial network. In other embodiments, a single database, number of databases in a RAID or other configuration, or any other appropriate number or configuration of data storage elements and/or devices can be used as would be obvious to one of ordinary skill in the art. These components can be constantly connected to the network, such as through a broadband connection, or can be periodically connected to the network, such as by dialing into the network via a phone line. The components can dial in or otherwise connect when needed for transactional or service purposes, and/or can dial in at regular or irregular intervals to ensure that any appropriate data and/or software is current and up to date. The network also may periodically connect with each component, such as to push out recent updates of items such as data or software modules.

A central network data system 108, including any components described or suggested above, can hold any or all appropriate data for the various components of the network. In another embodiment, at least some of the components have a dedicated database 110 or other mechanism providing storage for at least some of the data. These additional databases or data storage devices also can be used for backup or redundancy as known in the art. In one embodiment, data is stored in a local database 110 until notification is received that the data has been properly transferred and stored in a central data system 108, whereby the copy of the data in the local database 108 can be erased or set for erasure. It also should be understood that the central data system does not need to include a single set of devices at a single location, but can comprise multiple devices distributed across a variety of locations. These various data storage devices can include mirroring of data and/or distribution of data storage as is known in the art. Systems for managing data across a variety of data storage devices are well known in the art and will not be discussed in detail herein.

The network 102 also can be in contact with at least one third party system or device 112, such as a credit card network, banking system, or identification database. As will be discussed in detail later herein, there can be times in such a system where it is necessary to contact a third party to obtain information such as available credit limits, account balances, personal information, and other types of information. While it is possible to maintain at least some of this information within the system 100, it can be more efficient (and in some cases necessary) to utilize third parties to provide this information. For example, it is much easier and efficient to contact a banking network to determine how much a user has in a bank account than it is to maintain a copy of all potential bank accounts, which needs to be constantly updated. Such maintenance would be impractical if not impossible. As such, the system can include any of a number of necessary formats, protocols, applications, and other types of information and/or devices necessary to communicate with these third party devices to obtain the appropriate information. Once this information is stored, it can be retained in the system or erased from the system depending, for example, on the application and/or types of data.

Figure 2:
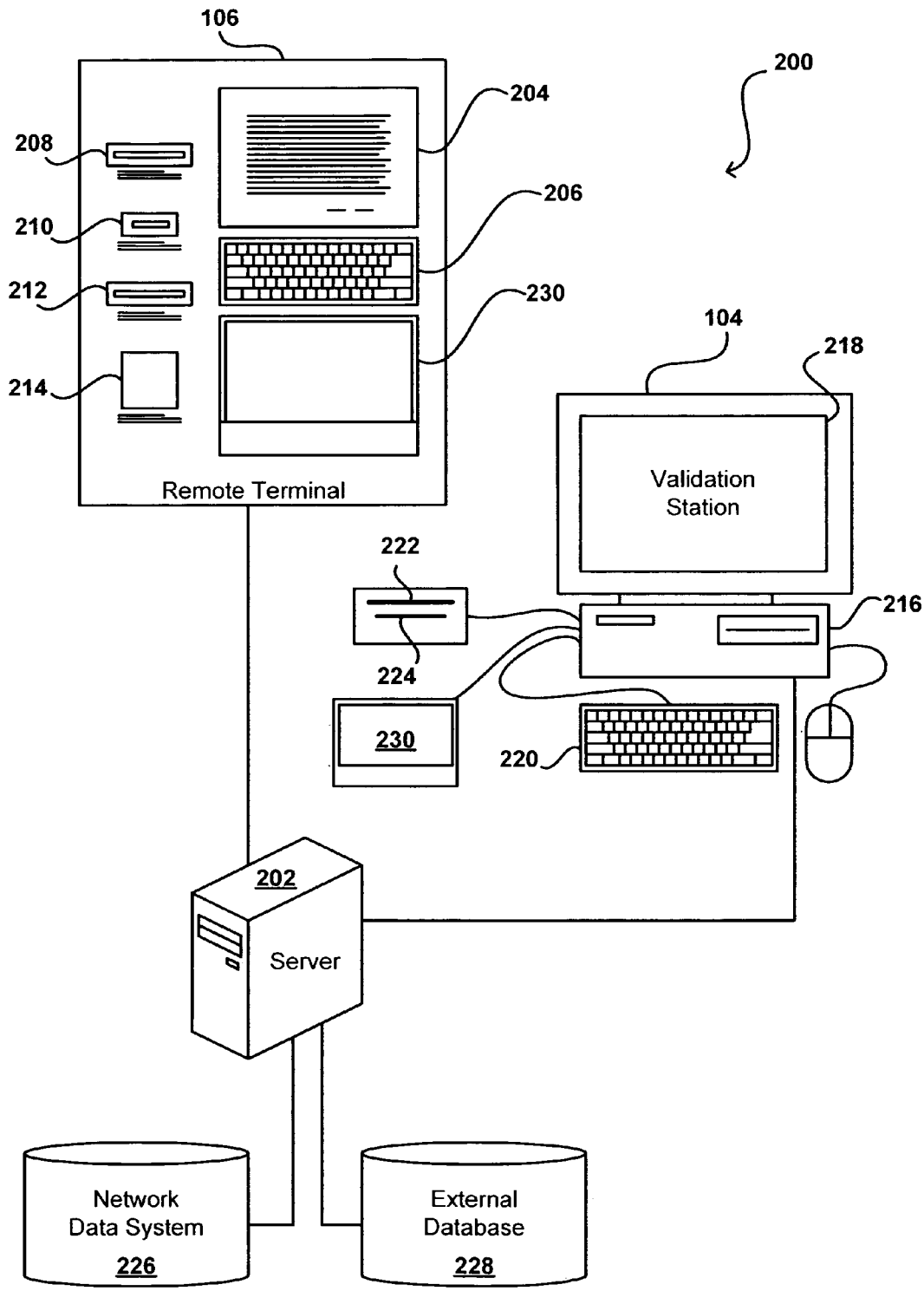
FIG. 2 illustrates a remote terminal and validation station that can be used in accordance with one embodiment of the present invention.

In order to provide a simple arrangement for ease of understanding, FIG. 2 shows an example of components that can be used in a financial services system 200 in accordance with one embodiment of the present invention. Reference numbers are carried over where appropriate for simplicity, but should not be read to limit the scope of the various inventions. It also should be understood that while only a single validation station 104 and a single remote terminal 106 are shown, and that these components may appear to be connected directly to a central server 202, that this system could include a plurality of validation stations and/or a plurality of remote terminals, which could be connected and/or networked together by any of a number of appropriate techniques known or used in the art and can connect to any of a number of servers, data storage devices, third party devices, and other appropriate devices as discussed above and known in the art.

The remote terminal 106 in this example is shown to include a variety of components useful for providing a variety of services, although many combinations of these and/or other components can be used as would be understood to one of ordinary skill in the art in light of the description and suggestions contained herein. A remote terminal 106 in some embodiments may comprise a relatively standard device, such as an ATM machine or personal computer, but in other embodiments may be uniquely configured to provide a variety of services possible using such a financial network. The remote terminal in this example is shown to include a display screen 204 for displaying relevant information to a user. This can include a standard display, such as a CRT or LCD screen, plasma screen, projector, or any subsequently developed display device(s) as would be obvious to one of ordinary skill in the art, and/or can include a device such as a touch-screen allowing the user to easily interact with the terminal through a graphical user interface (GUI) or other appropriate interface. Terminals also can be equipped with audio or other such equipment for users unable to interact with the terminal through use of the display device. This terminal also is shown to include a standard alphanumeric keyboard 206, although any of a plurality of other input devices such as keypads, mice, touch pads, pointers, track balls, joysticks, button arrays, RF ports, wireless input devices, bar code readers, magnetic code readers/writers, or any of a number of other input devices and/or methods known or used in the art can be used as would be obvious to one of ordinary skill in the art.

This exemplary remote terminal 106 also is shown to include a plurality of slots useful for conducting various financial transactions. These slots can be used with any appropriate devices useful for the various financial transactions, such as a check reader, card reader, chip or PIN reader, biometric device, cash acceptance or disbursement device, scanner, imager, OCR device, magnetic stripe reader, or other appropriate device known or used in the art.

For example, the terminal can include a check and/or voucher reader slot 208 (or swipe device, etc.), allowing a user to input, scan, swipe, or otherwise allow a check, voucher, or other paper object to be read by, scanned, accepted, or otherwise input into the terminal 106. Devices for reading such objects, such as by reading a bar code or alphanumeric information located on the object, are well known in the art and will not be discussed herein in detail. As will be discussed later, this "check reader" (as referred to herein without intent to limit the scope discussed above) can be used to simply read a check or voucher, for example, in order to obtain information contained on that item. In another embodiment, the check reader can be used to also accept the paper object, whereby the paper object is stored in a physical storage device or location accessible by, or contained within, the remote terminal 106.

The terminal 106 also can contain a card reader 210 operable to accept a card such as a credit card, online (with PIN) or offline (without PIN) debit card, gift card, merchant card, private label card, smart card, chip card (with or without PIN), driver's license, ID card, or any other appropriate card that stores, carries, or otherwise provides information that can be accessed by the terminal. Devices for reading such cards, such as by reading a magnetic strip or connecting with data stored on the card, are known in the art and will not be discussed herein in detail. The card reader can be used to pull any appropriate information, such as account or identification information, that can be useful in providing any of the variety of financial services. As will be discussed later, the terminal 106 also can use this information to deduct funds associated with that debit card or merchant card, for example.

A remote terminal 106 also can have a cash slot 212, or other acceptance mechanism, allowing a user to insert cash into the terminal. The terminal can contain and/or have access to a storage system for sorting and/or storing the inserted cash. The terminal also can have an internal device for validating the authenticity of the inserted currency. Systems and devices for accepting, validating, and storing currency are well known in the art and will not be discussed herein in detail. While many embodiments may be set up to accept a specific official currency, such as US dollars or Euros, or a variety of official currencies, other embodiments can accept other indicators of value. For example, if a remote terminal is located in a casino then the terminal might contain a receiving device capable of accepting chips, slot tickets, or other "currency" of that casino. In a location such as an arcade or night club, for example, the machine might accept the "currency" or indicator of value for that venue, such as a "club dollar" or "arcade coin" that typically has little to no value outside that venue.

Such a terminal also can include a scanning device 214, such as a bar code reader, camera, or other image or data capture device capable of obtaining data from an object held against and/or at a distance from the device. For example, as will be discussed later herein, a voucher may have a bar code printed thereon. If it is not necessary (or possible) to insert the voucher into a voucher slot 208, then a user may simply pass the voucher near the scanner such that the information in the bar code can be obtained. For embodiments where a voucher does not need to be retained by the terminal, a bar code scanner may be sufficient to obtain the information for the voucher. If vouchers are collected by a remote terminal, they can subsequently be collected, stored, scanned, archived, microfiched, or processed in any other appropriate manner. Further, such a device can quickly allow a user to see the balance contained on the voucher, by simply scanning the voucher to have the balance shown on the display screen 204, and may allow for use of a damaged voucher that a user may be afraid to insert into the appropriate slot 208 for fear that the voucher might get stuck and the user might not be able to obtain access to the funds associated therewith.

A remote terminal 106 also can include a cash drawer 230. In some embodiments, a user presenting a validated voucher to the remote terminal can receive funds from the remote terminal. As discussed elsewhere herein, the remote terminal can disburse funds up to the amount of the voucher. In cases where the remote terminal may not have enough cash on hand to cover the voucher, the user can have the option of receiving the amount of money in the remote terminal, then receiving a voucher for the remaining funds. The use and mechanisms behind a cash drawer such as are used in an ATM are well known, and as such will not be discussed herein in detail. The terminal also can provide standard ATM functionality as known in the art.

A validation station 104 such as is shown in the figure can include a computer device such as a standard personal computer 216, including a keyboard 220 and monitor 218. The computer device can have access to software allowing the PC to provide, perform, and/or execute various remote validation station functions as described herein. The software, or computer program product, can be embedded in a computer-readable medium as known in the art, which can take any of a number of various forms including, but not limited to, a hard disk, floppy disk, CD-ROM, flash memory, optical disk, DVD, carrier signal, or other such media. There are a variety of other peripherals and devices that can be used with a computer as is known in the art, including but not limited to a mouse, keypad, joystick, trackball, touch screen, printer, scanner, speakers, microphone, and a variety of external storage and access devices. The computer 216 can include a processor, memory, hard disk, and other computer components, or can be a simple terminal as known in the art. The computer can be connected to the network by an appropriate connection, such as a broadband connection, wireless broadband connection, Wi-Fi, Bluetooth, T1 line, DSL, IR, cellular connection, dial-up via modem, or local network connection known or used in the art. The computer also does not need to be a desktop or PC as shown, but can be any appropriate processing device such as a multi-function cash register. The validation station can also include devices similar to those described above with respect to the remote terminals, such as a card reader 222, a check reader 224, PIN or chip reader, biometric device, debit card provider, or any other appropriate device described or suggested elsewhere herein for providing the various services and/or transactions.

Such a validation station 104 can have the advantage that it is cashless, such that it is less prone to robbery than other cash-based institutions. By only processing vouchers and updating information electronically, for example, any merchant, proprietor, or other entity can act as a validation station, without the need for security staff, bullet proof glass, or other such elements. In alternative embodiments, where desired, a validation station can have a cash drawer 230, cash slot, coinage device, or other such device allowing the validation station to also provide services such as redemption of activated vouchers on site.

The validation station 104 also can be in communication with a central data system 226, such as may be controlled by, or accessed through, a central server 202 (in this embodiment) or any other master or central control and/or networking system, or any appropriate processing or routing device. A central data system 226, which can include a single data storage device or multiple storage devices, can be used to store data relevant to various transactions conducted across the overall system, including but not limited to customer data, voucher data, amount information, terminal data, validation station data, and any other appropriate data. The central server 202 also can be in communication with at least one external or third party database, as discussed elsewhere herein, in order to obtain such information as balance information, user identification information, and currency exchange rates. The third party data may also be available to each remote terminal, such as may be used for pre-authorization of a transaction.

There are many other devices that can be included or associated with a remote terminal or validation station as would be understood to one of ordinary skill in the art in light of the teachings and suggestions contained herein. The devices shown are intended to be examples of possible devices that could be included, and are not meant to be required or exhaustive in scope. The configuration of a validation station or remote terminal can depend upon many factors, such as the type of location in which the device is placed. For example, a validation station at a grocery store service counter might be set up differently than a validation station in a casino.

There can be many services and/or transaction types provided using various methods in accordance with various embodiments of the present invention using a system such as those described with respect to FIGS. 1 and 2. Some of these methods and services will now be described for understanding and clarity, but it should be understood that these methods and services are meant to be examples only, and that there can be a variety of other services provided, each with a plurality of different methods for providing those services, which would come to mind to one of ordinary skill in the art in light of the teachings and suggestions contained herein.

In one exemplary method, a user wishing to engage in a transaction and/or obtain a service using the system will visit a remote terminal. The user can select the service to be provided, such as by selecting from a menu displayed on a display screen. In other embodiments, the user may select a service by simply inserting an appropriate object, such as a credit card, check, or cash into the machine, which can determine the type and/or validity of the object, and can determine relevant services that can be provided to the user based on the inserted object. For example, if the inserted item is a check, the remote terminal might assume that the user wishes to obtain a voucher for the amount of the check (minus any service or other fees). The user may then have to confirm that this is the case. In another embodiment, the remote terminal might issue a voucher for the full amount input by the user, then subtract any service or other fees from the amount disbursed when the voucher is eventually redeemed. Deducting the fees upon disbursement allows for fees to be charged each time cash or another service is received using the voucher. In another embodiment, an initial fee is deducted when the voucher is issued, then a separate fee can be applied any time cash or a service is received using the voucher.

When a user inserts a credit card, for example, there may be multiple options that the remote terminal offers based on credit card insertion. In this case, the remote terminal might only display menu items corresponding to those options. For example, after a user inserts a credit card the machine might ask or prompt the user to select one of the options displayed based on the credit card, such as a cash advance or money transfer. There also can be an option that allows the user to select from all services offered by the terminal, even if one of those services are not generally associated with a credit card. For example, a user that does not have readily available a standard identification card (such as a driver's license, state-issued ID card, government-issued ID card, passport, or other appropriate ID card or ID element) might insert a credit card to be used for identification or some other purpose. Inserting the credit card can allow the machine to obtain identification information for the user, either from the magnetic stripe or by connecting an issuing institution for that card. The user then might want to use cash, a check, or some other payment mechanism to obtain a financial service. Options that can be displayed to the user in such a situation might include, for example, the ability to charge a transaction to the credit card that will result in a voucher or check being presented for that amount (with the transaction fees being added to the transaction amount, deducted from the voucher amount, or otherwise paid by the user), or the ability to credit an amount of an existing voucher back to the credit card. Many other appropriate options can be presented as would be obvious to one of ordinary skill in the art.

Once the user selects a type of transaction or service, the remote terminal may ask or prompt the user to input additional information, either by inserting an object containing or providing the ability to obtain the information, or by manually inputting the information, such as through use of a keyboard, keypad, or touch screen. The type and amount of information can depend upon the type of service or transaction. For example, if a credit card is inserted, the user might have to input an amount to be charged or credited to the account associated with the card. If a personal check is inserted, a remote terminal might ask the user for information pertaining to the check, such as where the information cannot otherwise be read, scanned, or OCR processed, whereby the remote terminal can issue a voucher to the holder, or can validate the check, attach a voucher identifier or other appropriate identifier, such as by printing an alphanumeric identifier, and allow the user to use the check as a voucher to take to a validation station. If a barcode is printed on the check, for example, that barcode can be associated with information stored on the system, including information such as the amount of the check, check number, etc. Just scanning the bar code then allows information about the check stored on the system to be accessed without having to rescan the check data. If a bank check is inserted, whereby the remote terminal might be able to automatically determine the amount, the user might simply have to confirm that a voucher is to be issued for the amount of the check. In some embodiments where a bank check or other defined-value object is inserted, a voucher might be automatically printed for that amount.

If necessary, the remote terminal can contact an appropriate external system or data source in order to obtain additional information. For example, for a credit-card based transaction the remote machine might contact a company that issued the credit card, either directly or through a credit card network, to determine, for example, whether the requested amount for the transaction is authorized, whether the card is still valid, and/or how much remaining balance is associated with the credit card account. For a check-based transaction, the remote terminal might need to contact the issuing bank to ensure that the relevant account contains sufficient funds to cover the check, or may contact a check authorization or guaranty company to attempt to determine whether the check is good. In transactions such as cash-based transactions, the machine might not need to obtain any information from a third party. In some embodiments, a remote terminal might only obtain this third party information for certain services or transactions, or might not obtain any additional information. Where the remote terminal does not obtain any additional information, the additional information can be subsequently obtained by a validation station as will be discussed below.

Any information obtained for a transaction or service can be written to a database at the time of validation, or at any other appropriate time. In some embodiments, information can be stored locally and a batch update to a central database or data system, for example, can be sent at a later time. In other embodiments, updates can be sent at regular intervals to a central data system, or can be sent as information is obtained or received. This data can be written directly from memory on the remote terminal into a data store on a central data system, for example, or can be written to a local database. If written to a local database for the transaction, the data can be uploaded to a central data system at a later time, or can be pulled for a validation station when the data is needed to authenticate a user and validate a transaction voucher. In other embodiments, the data can additionally or alternatively be written to, for, or on the voucher. The data can be stored, transferred, and/or archived in any of a number of other ways as would be known to one of ordinary skill in the art. For credit card transactions, the remote terminal can contact a credit card company for an authorization or pre-authorization, and a subsequent validation station can flag the transaction for settlement, for example, once the user is authenticated in order to actually charge the amount to the card.

In one embodiment, a user can simply insert a voucher (such as a card, piece or paper, or any other voucher described or suggested herein) and/or voucher identifier, whereby the system can access data from a database, from the voucher itself, or from any other appropriate location, and can simply auto-fill the information as necessary. For example, a check might have a bar code or other identifier printed on it that can simply be scanned to access data in a database. The check also can have an encrypted bar code or other indicia that includes the information for the check, which then can be obtained simply by scanning, swiping, or otherwise reading that indicia from the check. In some cases, the check may be retained by the system upon redemption, which in other cases the check may be returned. Whether the check is returned can depend upon how the data is captured, as discussed elsewhere herein.

In some embodiments, an authenticated user does not have to re-authenticate for each transaction or service, but can simply present an activated voucher and/or voucher identifier and can access the various financial services. In this case, a user accessing the system just provides the voucher and/or voucher identifier, or information associated therewith, and can obtain a financial service using already-authenticated information to obtain additional financial services without revalidation. Also, the recipient can be authenticated such that the recipient does not have to re-authenticate. In such situations, the user and recipient each can obtain financial services, and can send money back and forth, using activated vouchers and/or voucher identifiers without having to be re-authenticated. In one example, the user can input the user's identifier, the recipient's identifier, and an amount to transfer, and the transfer can be made to the recipient's voucher whereby the recipient can access the finds immediately using the recipient's voucher and/or identifier. In some cases, this can act like a personal service number, such as a credit card number or other card number, which can be used for various financial services and transactions without requiring re-authentication. Even where re-authentication may be required, the same user identifier can be used. This identifier does not have to be a card number, but could be any of the indicia described and suggested herein, such as alphanumeric identifiers on a paper voucher or an encrypted identifier on a smart card. The user then can use the voucher like a debit card, for example, whereby the voucher with the same identifier (or a different identifier) can be used repeatedly. In some cases, an authenticated user might reuse a user identifier, allowing the user to not have to be re-authenticated, but can utilize unique voucher identifier, which could just be associated with the user identifier. When, where, and how often a user and/or recipient has to re-authenticate can be governed by local, federal, or other laws, rules, and/or regulations as discussed elsewhere herein.

In some embodiments, a user can provide, or be assigned, a username and password, or other appropriate indicia of identity known or used in the art, that allows the user to save information between sessions. A user establishing a username and password, for example, can simply enter this information into a remote terminal to bring up data for that user. Information for such a case can be auto-filled onto, into, or for the voucher, if indicated by the user, for example, whereby the user does not need to manually fill in any information on, into, or for the voucher. Other information that can be used to store and access information can include, for example, a driver's license, ID card, or passport number and a PIN number, voucher, voucher identifier, or personal identifier. In another embodiment, the user may simply be able to enter an item into the system, such as by swiping a driver's license or scanning a passport, then enter a password or PIN number. Any time a user accesses information from the database, the user can have the option of auto-filling the information onto the voucher. In other embodiments, a user having information in the database may be provided with a voucher that does not include fields to be filled out, since the system has the information, and also does not print the information. In still other embodiments, the driver's license or other indicia used may allow the information to be pulled directly from a third party database, which can allow the information to be printed and/ or stored as discussed above.

In another embodiment, a user might access a Web site associated or in communication with the network. In this case, the Web site (and the computer, terminal, or processing device displaying the site) can act as a remote terminal. A user can input necessary information, such as identification information and a request for a financial service. After the necessary information is input, the user can be issued a voucher or voucher identifier. If a voucher identifier is issued, this can take the form of an alphanumeric identifier that is displayed on the screen, emailed to the user, available for printing, or otherwise communicated to the user, whereby the user can present the alphanumeric identifier at a validation station in order to validate the identity of the user and obtain an activated voucher. If a voucher is issued, this can take the form of an electronic document, such as a display window or pane, word processing document, image, email message, or other electronic document capable of being printed, downloaded, or otherwise accessed by the user for presentation at a validation station. A user then can present a printed voucher to a validation station, use the voucher identifier for the voucher, or electronically transfer a version of the voucher to the validation station, such as by using a Wi-Fi connection to transfer voucher data to the validation station. Once the user receives a validated voucher from a validation station, the user can use the same Web site or a related Web site to redeem the financial service, such as to receive funds from the voucher to a bank account or to pay for items on a related or third party Web site.

As discussed above, after a remote terminal has obtained all the information that the terminal requires to perform that service or transaction, the remote terminal can issue the user a transaction voucher related to that transaction and/or service. If an object such as a smart card is issued, data for the requested transaction or service can be stored in the card, and does not necessarily have to be written to a system database. If a magnetic strip or barcode-based card is issued, the information can be stored to a database or data system, as described elsewhere herein, whereby the information can be associated with, or tied to, the card number or other indicia of card identity. If a printed voucher is issued, for example, the data can be printed thereon, either in legible form, bar code form, or in a proprietary, encrypted, or other such form. In one embodiment, a voucher will only contain a bar code having an associated alphanumeric identifier that allows a validation station to easily determine the alphanumeric identifier. The alphanumeric identifier can be any appropriate combination and length of letters, numbers, and symbols, for example, useful in identifying the voucher, such as a 16 or 18 digit number, or a 20 digit identifier including 10 letters and 10 numbers or less. While an identifier of as little as a single character is possible, longer character length identifiers tend to be more secure as known in the art. Such a form also may include lines that allow the user to fill in information, as will be discussed below. In other embodiments, a remote terminal can print, or "auto-fill," information on the voucher, using some or all of the information obtained from the user. In some embodiments, the user can control how much information is printed on the voucher.

A transaction voucher can act as a documentary record of a business or financial transaction initiated by the user. In one embodiment, the voucher can act as a receipt. In another embodiment, such as where a voucher will eventually be collected, a separate receipt can be provided to the user, either physically or electronically depending upon the transaction circumstances as discussed herein. The voucher typically will not truly represent a form, object, or certificate indicating a credit against which financial services can be processed, such as a dispensing of cash associated with the voucher to a holder of the voucher, until the transaction voucher is "activated" at a validation station. A voucher can be said to be activated when the identity of the user is authenticated, and the voucher validated, at a validation station using any of a number of approaches such as those discussed below. A time limit such as three hours can be set for the voucher, as described elsewhere herein, wherein a voucher must be activated at a validation station within a certain amount of time of issuance of the voucher.

A user can take a transaction voucher, or identifier associated therewith, to any validation station associated with the respective financial network. Validation stations typically can include an employee capable of facilitating the validation process, but also can include stand-alone validation stations as discussed below. Validation stations can be used to ensure that any necessary information is collected in some embodiments, while in other embodiments the validation stations are used primarily to prevent fraud. For this example, a validation station with an employee used to prevent fraud will be discussed. In some embodiments, there can be a limit set on the amount of time that can elapse between the initiation and validation processes, such as a limit of three days or a week. In an embodiment such as a casino where the remote terminals and validation station(s) might be in the same building, the limit can be on the order of hours.

Once at a validation station, a user can hand the voucher or present the identifier to the employee at the station. Information relating to the voucher can be entered into the validation station in any of a number of ways. In some embodiments, the user can enter the information at a kiosk or other workstation of the validation station, wherein the employee only is involved in a final validation step such as the review of a photo ID or the performing of a signature comparison. Information for a voucher can be entered, for example, by scanning a bar code of the voucher with a bar code reader or inserting the voucher into a reading or imaging device. In another embodiment, the employee can simply enter an alphanumeric or other voucher identifier into the system, such as by typing in or entering the identifier using a mouse or touch screen. Any of a number of other ways for inputting data from an item into a computer or processing device can be used as known in the art.

Upon entering the voucher information or identifier into the validation station, any information associated with that identifier that is stored on the voucher or financial network can be accessed and retrieved as needed. For example, credit card numbers or account information associated with the voucher can be retrieved and displayed to an employee for validation purposes. In another embodiment, no information may be retrieved and/or displayed to the employee. In an embodiment where the user manually fills out the voucher by writing on the information, the employee might simply view items such as a driver's license, state- or government-issued ID, ID card, or passport to validate the identity of the person whose name is on the voucher without collecting or entering any information. Once the identity of the person is authenticated, the employee might simply indicate electronically to the system that the user has been validated, such as by selecting an "authenticated" option using a Graphical User Interface (GUI) of the workstation, scanning the bar code on a voucher into the system, etc. The "authenticated" option can cause a flag to be set in a database that designates the voucher as "active." In another embodiment, the employee might collect information from the user and enter that information into the validation station in order to store that information in a data store on the network. The employee might collect this information by asking questions and physically typing in the information. In another embodiment, this information can be automatically filled in, such as by scanning, swiping, or otherwise reading a driver's license, ID card, or passport and having the scanner retrieve the information to be auto-filled into a database. In one example, an employee can compare a photo ID with a user's appearance, obtain a social security number for the user, and/or compare the user's signature on the voucher to a signature on a form such as the photo ID, a credit card, or the like The employee also can collect and/or enter any appropriate information for the user or transaction into the system through the validation station. Once the user has been authenticated and all necessary information collected, an activated voucher can be presented to the user. The voucher can also be made into a check or draft, depending upon the type of transaction and other such circumstances as would be obvious to one of ordinary skill in the art.

After the identity of the user is authenticated, the user can be presented with a validated voucher. This validated voucher may be the original voucher obtained from a remote terminal which has been flagged in the system, or may constitute a new voucher. The voucher can have indicia of validation, such as a stamp, sticker, print, punch, data stamp, merchant ID, partial credit card number, or other such indicia, or may not have any such indicia. In one embodiment, the voucher information can just be flagged in the system, or an appropriate database, for example. The user might simply be given a receipt showing that the voucher has been validated and/or activated. The validated voucher may be of the same type as the original voucher, or may be of a different type. For example, an initial voucher printed from a remote station might encompass a paper voucher having a bar code printed thereon, along with information such as the type of transaction, a dollar amount, a date and/or time stamp, a terminal number, and a location identifier. If the form of payment and type of service also are entered and/or approved, the voucher can be activated as discussed elsewhere herein. An activated voucher, on the other hand, might be an item such as a card or smart card having information such as user identity and amount information stored thereon, or a credit card or online/offline debit card having the information associated therewith in an appropriate data storage location accessible to the network. The activated voucher can be the original voucher or a new voucher having the same or a new voucher identifier (or a first voucher identifier if one was not previously provided).

In one embodiment, the user can have a choice of formats for an activated voucher. In an instance where the user plans on using the voucher to provide information, such as by placing a filled-out voucher into a remote terminal, the user may choose to retain an original paper voucher, or receive a new paper voucher. Where the user simply plans on sending someone an alphanumeric identifier from the voucher, the user also may wish to simply retain the original paper voucher. In other instances, the user may prefer a debit card, for example, which would allow the user to withdraw from the associated funds using one of the remote terminals in a way that is familiar to the user. In another embodiment, the user may wish to receive a smart card that allows the user to make purchases or conduct other transactions without having to carry around a large amount of cash and in a way that is accepted by various merchants. In some embodiments, a user may choose to receive multiple vouchers, which can be of different forms, allowing the user to distribute funds across multiple vouchers. This can be useful for sending multiple amounts to multiple people while only having to go through one validation process, as well as being useful for allowing a user to carry around vouchers in smaller denominations for safety or other purposes.

Once the user has possession of an activated voucher, the user can perform any of a number of tasks using the voucher and/or identifier in accordance with various embodiments of the present invention. For example, the user can take the voucher or identifier to any remote terminal in the financial network and use the voucher or identifier to withdraw funds at any desirable time. The user also can withdraw funds from a validation station in some embodiments, whether the station is manned or unmanned. The user also can send (by mail, phone, email, physical delivery, etc.) the voucher or identifier to another person or entity, or simply provide that person/entity with an alphanumeric or other identifier associated with the voucher, along with any other necessary information, who then can use the voucher and/or identifier to withdrawn funds using any remote terminal on the financial network. The user also can use the voucher to engage in financial transactions with any merchant or other entity having access to the financial network. If the user receives a debit or other card that is also supported by third party financial network, such as a global ATM network, for example, the user also may be able to use the voucher at any location and in any way that a user of that third party financial network typically would use that network. There are a number of other uses and applications described and/or suggested herein, as well as would be obvious to one of ordinary skill in the art in light of the description contained herein.

Figure 3:
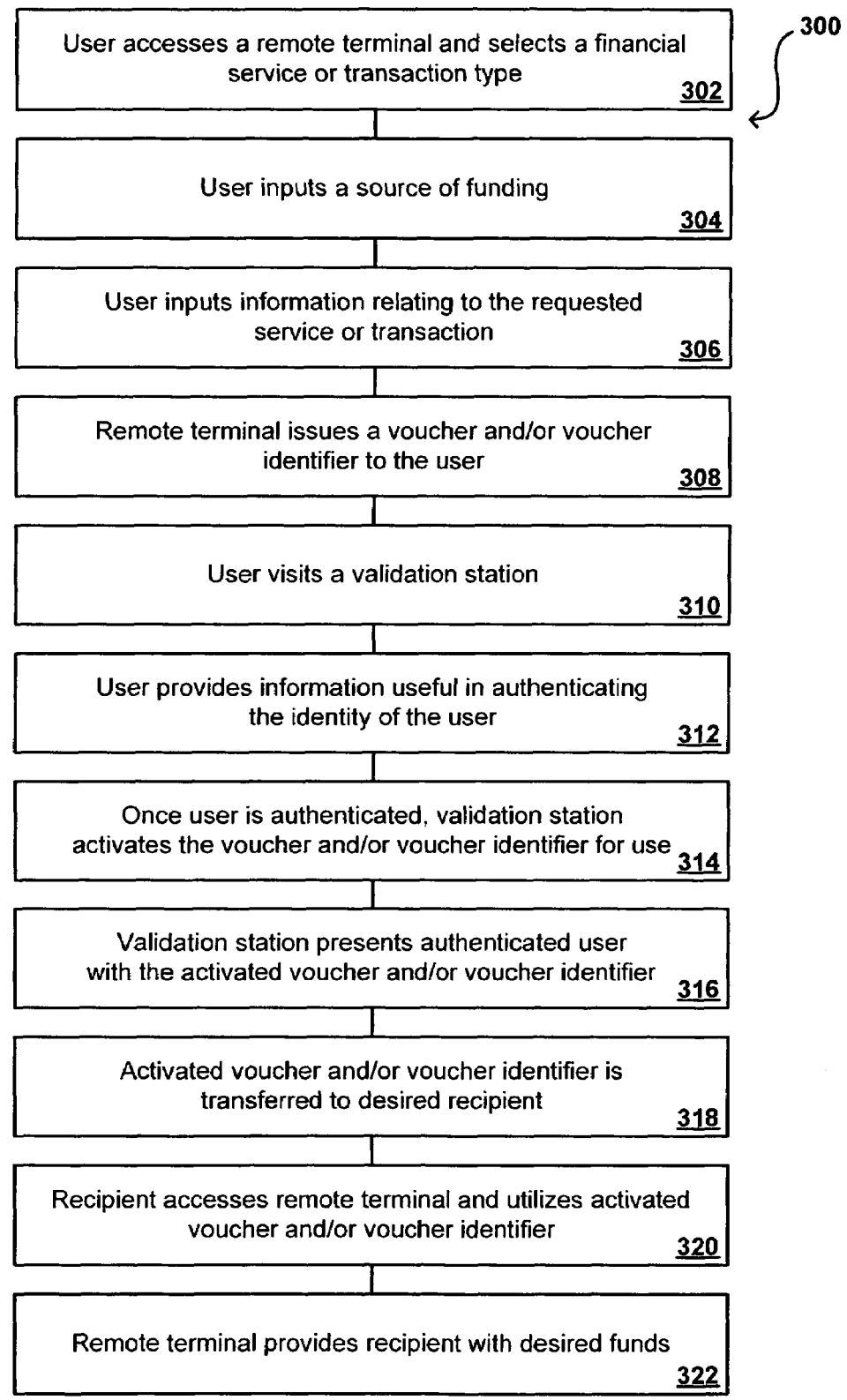
FIG. 3 illustrates steps of a first process that can be used in accordance with various embodiments of the present invention.

FIG. 3 illustrates steps of an exemplary method 300 that can be used in accordance with various embodiments. This particular method describes one possible process for a user wanting to obtain a voucher for a specific denomination that can be used to send money to another person in a different location. In this method, a user accesses a remote terminal and selects a financial service or transaction type provided by the remote terminal 302. The user then inputs a source of funding 304. The source of funding can be any appropriate source acceptable by the remote station, such as cash, a check, a credit card, an ATM card, an online or offline debit card, a smart card, or any other source known or used in the art for providing or accessing funds. A source of funding in some embodiments also can be another voucher, such as where a user wants to credit another voucher or utilize funds from that voucher to obtain cash or another financial service. The remote terminal also can accept any information needed and/or useful for the selected service and/or transaction 306, which then can be used in any appropriate way, such as printing or storing on the voucher, storing to a database, reporting to a financial institution, discarding after voucher issuance, or any other appropriate use. The remote terminal then can issue a voucher 308, which can contain or have associated therewith any appropriate information and be in any appropriate form as discussed elsewhere herein. In some embodiments, the voucher can include all the necessary data, such as contained in the barcode or printed thereon, whereby no data for the voucher needs to be stored.

Once the user has the voucher, the user can visit a validation station 310 in order to authenticate the identity of the user. The user can provide the validation station with any appropriate identifying articles or information useful in authenticating the identity of the user 312 as discussed herein, such as a driver's license, social security number, and/or passport. Once the validation station has verified the identity of the user, the validation station can activate the voucher 314, such as by setting a flag in a network database indicating that the user has been authenticated and the voucher can be used for the requested service and/or transaction. The validation station also can obtain information useful for redeeming the voucher, such as a user-provided username, password, or other identifier, that can be used with a voucher identifier, for example, to redeem the voucher (thereby helping to prevent fraud, theft, etc.). The password then can be used by the user or a recipient of the voucher, who may receive funds or a financial service at the same or a separate location. The validation station then can return the activated voucher, or present a new activated voucher, to the user 316.

Once the user has an activated voucher, the user can provide the voucher or an associated voucher identifier to the desired recipient 318. As discussed elsewhere herein, the user could simply provide the recipient with any necessary information for the voucher, such as the alphanumeric identifier and possibly a PIN number, for example, allowing the user to access the network without actually having physical possession of the voucher. Once the recipient receives the voucher or information, the recipient can access any remote terminal and present the voucher or information to the remote terminal 320. As discussed above, this can involve inserting or scanning the voucher, or typing in an alphanumeric identifier, for example, in order for the remote terminal to access the record(s) for the voucher. Once the remote terminal determines the voucher is valid and activated, and determines the value of the voucher, the remote terminal can provide the recipient with the intended funds 322. In some embodiments, the recipient can opt to receive less than the full amount, either leaving the remainder "on" the voucher, or receiving a new voucher for the reduced amount. In other embodiments described herein where a recipient of the voucher might require authentication, the remote terminal might accept the voucher and issue a new voucher to the recipient to be used for validation. In some embodiments, the recipient might have to visit a validation station as described elsewhere herein, depending upon factors such as the type or amount of the financial service and any local, national, or other laws, rules, and/or regulations.

Figure 4:
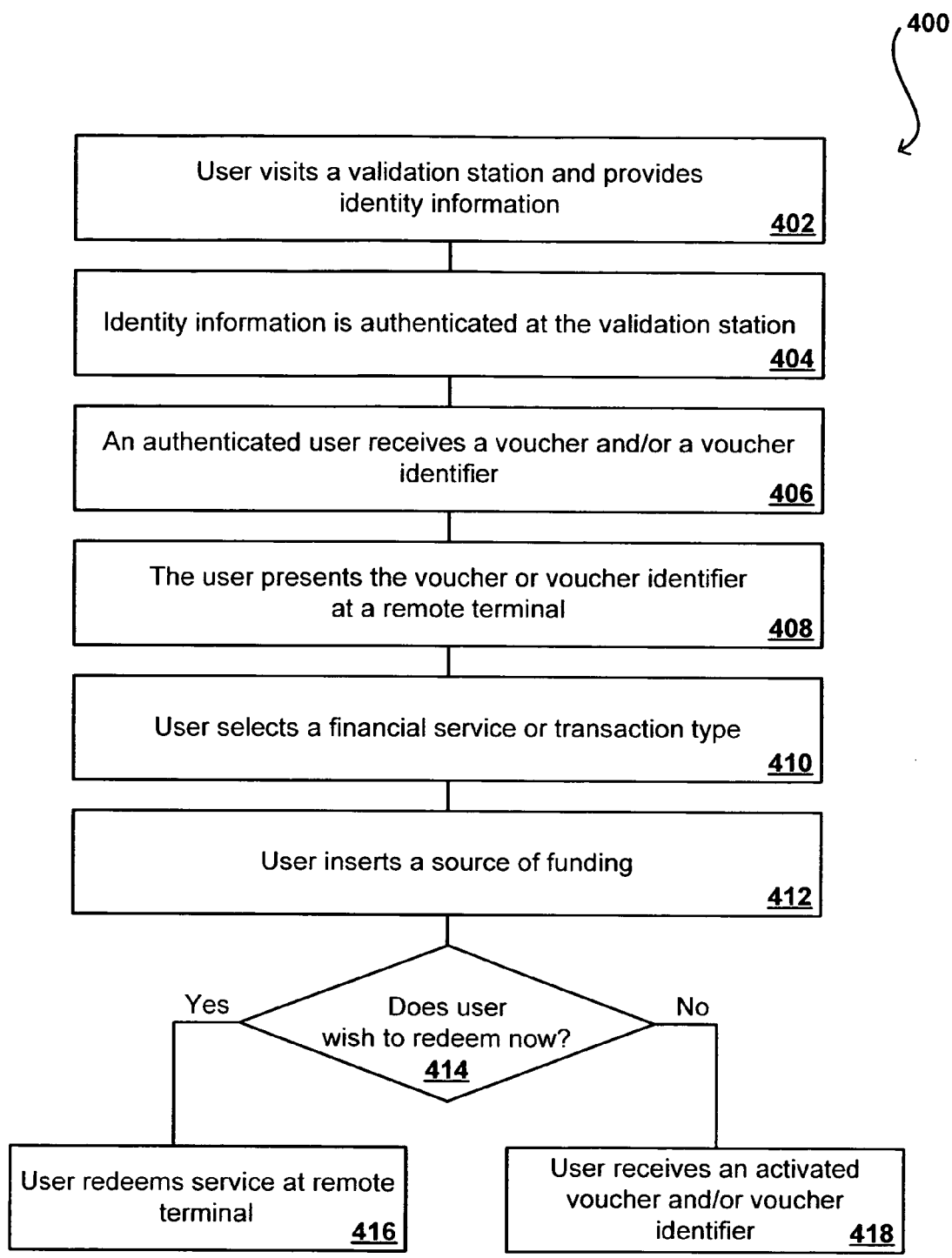
FIG. 4 illustrates steps of a second process that can be used in accordance with various embodiments of the present invention.

In another embodiment, a user might first visit a validation station. FIG. 4 illustrates steps of an exemplary method 400 for such an embodiment. In such a process, a user can visit a validation station and provide identity information 402. An employee at the validation station (for a manned station) can authenticate the identity information, such as by viewing a photo ID and verifying a signature 404. For an unmanned station, identity can be authenticated using other processes described elsewhere herein, such as biometrics and/or digital signature capture. Once the user is authenticated, the user can be presented with a voucher, which can include a voucher identifier 406. The user then can present the voucher and/or voucher identifier to a remote terminal 408, which can accept or scan the voucher, or receive the voucher identifier by scanning, user input, swiping, or any other process described or suggested elsewhere herein. The user then can select a financial service or transaction type 410 and insert a source for funding 412, in any order. If the user wants to redeem the service at that point 414, the user can simply redeem the service such as by receiving cash 416. If the user does not wish to redeem at that point, the user can receive an activated voucher 418, either the same voucher or a new voucher having the amount and/or financial service associated therewith. If the voucher did not previously have a voucher identifier, a voucher identifier can be associated with the voucher at this point. This voucher subsequently can be redeemed by the user or a recipient at any appropriate remote terminal or validation station using the voucher or voucher identifier. If a recipient redeems the voucher, the recipient may have to be authenticated as discussed above and may receive a new voucher (or the same voucher) to be used for redemption. The voucher(s) may be scanned or kept, as described elsewhere herein.

Figure 5:
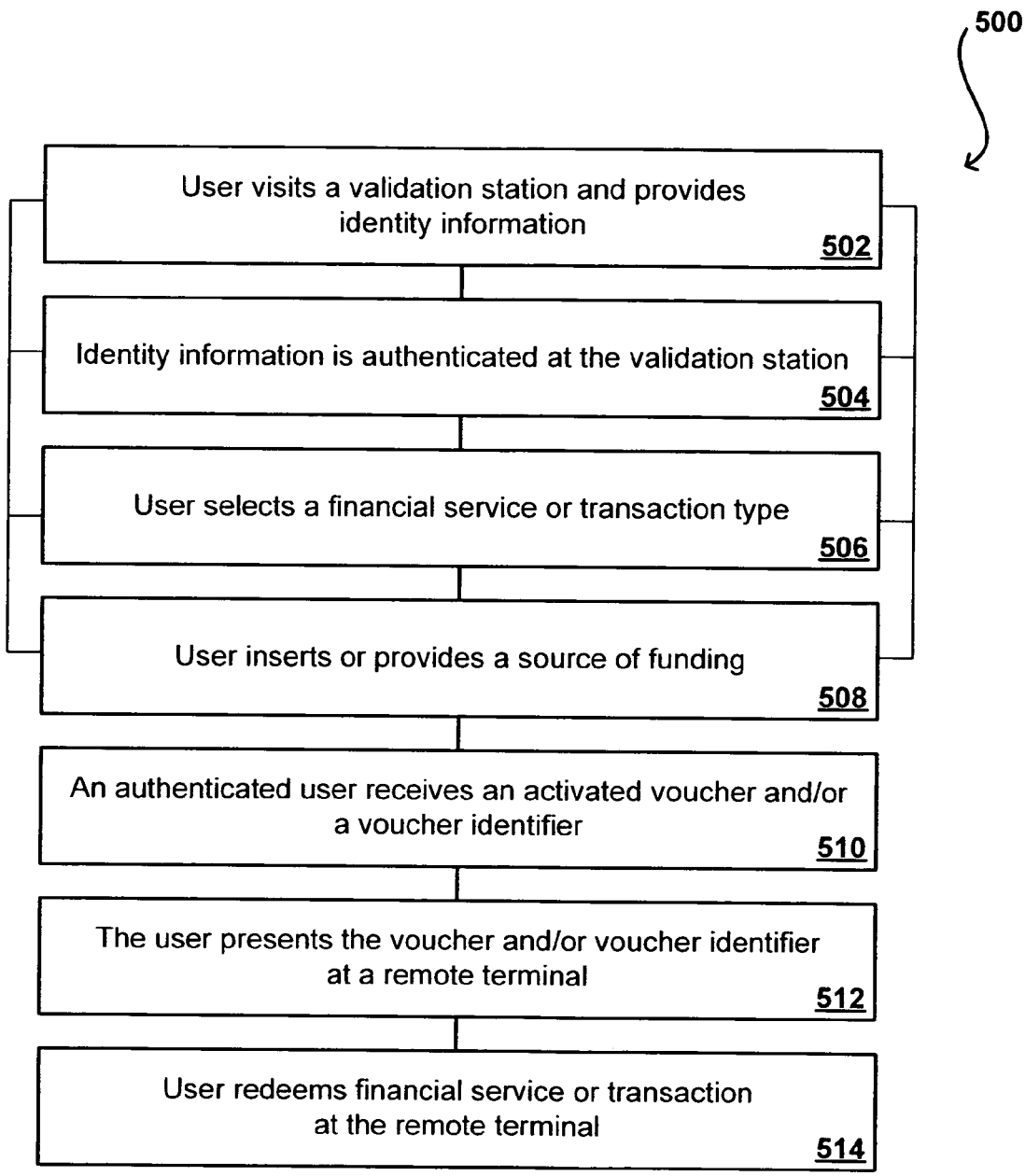
FIG. 5 illustrates steps of a third process that can be used in accordance with various embodiments of the present invention.

In another embodiment, FIG. 5 illustrates steps of an exemplary method 500 where a user can first visit a validation station and provide identity information 502. The identity of the user can be validated, such as by having an employee (for a manned location) view a photo ID (or other ID) and verify a signature 504 as discussed above. For an unmanned station, identity can be authenticated using other processes described elsewhere herein, such as biometrics and/or digital signature capture. The user also can select a financial service or transaction type 506 and insert or provide a source for funding 508. Steps 504, 506, and 508 can be done in any order, as would be understood to one of ordinary skill in the art. Once the user is authenticated and the source of funding and financial service selection are verified, the user can be presented with an activated voucher and/or voucher identifier 510. The user can present the activated voucher and/or voucher identifier at a remote terminal 512, which can accept, swipe, scan, or otherwise read the voucher, and/or receive the voucher identifier by scanning, user input, swiping, or any other process described or suggested elsewhere herein. The user then can redeem the requested service or transaction 514, such as by receiving cash or another such service. The voucher(s) may be scanned or kept, as described elsewhere herein.

In some embodiments, a user might be allowed to complete the financial service or transaction request at the validation station. For example, if a user is trying to cash a check, a user could insert the check at a remote terminal to get a voucher. The check can be kept in one embodiment, or can be scanned or otherwise have the data captured and then returned to the user in another embodiment. Once the user is validated at the validation station it is possible that the employee (or an automated system) can simply disburse the finds at the validation station. In such an embodiment, if the user information is not entered into the system, the validation station also can be required to accept and retain the voucher, where desirable or necessary, in order to ensure that the network has any necessary information for the user. A validation station may have all the abilities of a remote terminal as far as processing a validated voucher.

In another example, a user might wish to quickly access funds from the system using a credit card. If the user presents the credit card to a standard ATM using a PIN number associated with the credit card, the transaction will be processed as an ATM transaction, which can have a daily limit and an associated charge. If the user instead presents the credit card to a remote terminal without providing a PIN number, for example, the remote terminal can process the transaction as a cash advance (which can have a different limit set by the issuer of the card) and present a voucher to the user. The user can take the voucher to the validation station, where the user can simply receive the cash once the user is authenticated (such as by checking a photo ID and having the user sign the voucher with an authenticated signature) and/or the voucher activated. In a casino example, the user may simply receive casino chips for the amount of the voucher. This provides an easy way for a user to obtain chips on the casino floor using a credit or debit card, for example, without having to worry about low cash advance limits or high cash advance fees.

In some embodiments, a user can receive a receipt along with the voucher, or the voucher can come with a tear-off stub portion, for example, whereby the user can hang onto the receipt if the user sends a voucher to someone else or otherwise wants a secondary way to identify the voucher. The receipt can be useful in various circumstances. For example, if a user sends a voucher to someone, but later decides or needs to withdraw the funds, the user can simply use the voucher number displayed or otherwise stored on the receipt. A receipt also can allow a user to cancel a voucher using the identifier on the receipt, such as where a voucher is lost, damaged, or stolen. Upon canceling, the user can choose to receive a new voucher or simply cash out, where appropriate. In order to cancel and issue a new voucher, the user likely will have to go through another validation process. In another embodiment, the user can simply use the voucher identifier to cancel the voucher, such as by providing the identifier to a customer service representative or inputting the information into a remote terminal.

In general, the fees associated with such a system can be lower than for other systems. For example, an immigrant wishing to send money back home or a parent wishing to send money to a child away at college can use this system to obtain and send a voucher for a fraction of the cost of wiring the money using conventional methods. Further, the recipient can have much easier access to a remote terminal than to a location wherein wired money can be obtained. Another advantage in accordance with some embodiments is that the recipient can have the option of using the voucher like a debit card or gift card, in that the recipient can choose to receive funds in increments, each time deducting an amount from the available balance. The recipient can continue to do this until the funds associated with the voucher are all disbursed. If any funds are unused, some embodiments allow the user to receive a refund. This can take the form of, for example, a credit to a credit card account. In other embodiments, the recipient can receive a voucher for the unclaimed funds that can be sent back to the user. Where the voucher is in the form of a money card, for example, the recipient can simply use the card to process transactions until the associated funds are used. In such a case, a central data store on the network can maintain the balance information, and/or the voucher itself (where the voucher is a smart card, etc.) can contain the remaining balance information.

In another example, a user winning a large sum of money in a casino may not wish to carry that much cash around. The user can insert the cash into a remote terminal, and receive a voucher. Once the voucher is validated, the user can use the voucher to obtain cash or chips as needed. Once the user is finished, the user can "cash out" by inserting the voucher in an appropriate terminal and receiving cash, check, credit, or some other disbursement of the funds associated with the voucher. In some embodiments, the user may be able to insert a voucher and additional funds into a remote terminal, and receive a new voucher for a new amount including the previous balance and the added cash.

Some remote terminals might not include cash drawers, and may only be used for inputting information and receiving vouchers, and/or processing services or transactions that do not actually issue cash (such as bill pay, etc.) Other remote terminals may not allow a user to input information and receive a voucher, but may accept vouchers or voucher information and issue cash in response thereto. Any of a number of other configurations are possible in accordance with the teachings and suggestions contained herein.

In some embodiments, it might also be necessary for the identity of the recipient to be authenticated. This may be due to local, national, or other laws, rules, and/or regulations, which may require a compliance system on the network as known in the art, or may simply be a design choice. In such a case, it may be necessary for the recipient to also visit a validation station. In one embodiment, the recipient visits a validation station as a user would. The recipient provides the voucher or voucher information to the validation station, and also provides any items and/or information necessary to authenticate the identity of the recipient. In some embodiments, information for the recipient will have been provided by the user, either entered into the system (such as by entering a password, PIN number, or social security number through a keyboard) or written on the voucher, and the identity of the recipient must match this previously-presented information. In other embodiments, where the information for the recipient may or may not have been provided by the user, the recipient may simply authenticate his or her identity. After the identity of the recipient has been authenticated, the recipient may receive back the same voucher, or may receive a new voucher. For example, if the validation station does not capture and store information about the recipient, it may be necessary for the recipient to receive a new voucher, whereby the recipient can fill in identity information to be collected upon redemption of the voucher.

For other embodiments, the recipient may not have to provide any authentication or identification information. For example, a recipient might be able to simply take a voucher to any remote terminal and present the voucher to the terminal, such as by inserting or scanning the voucher. Once presented, the recipient can receive the associated funds or otherwise engage in a transaction or financial service associated with the voucher. If there is a remaining balance associated with the transaction, and the recipient has inserted the voucher, the recipient can receive back the same voucher or a new voucher. In other embodiments, the user can simply input information associated with the voucher, such as an alphanumeric identifier, by typing or otherwise entering the information into the remote terminal. As discussed above, there may be a PIN number or other information to be inserted in order to prevent people from simply entering identifiers into a terminal in hopes of lucking upon an active voucher identifier. In some embodiments, the terminal can be set to "lock" entry of information after a number of failed attempts, such as three attempts. This lock can be for an appropriate amount of time, such as one minute or five minutes, or can require an employee to visit to unlock the terminal. In some embodiments where a system detects multiple failed attempts, the system will allow the continued attempts to fail without locking the system, but will prevent any of the identifiers from successfully accessing funds or other services. In the meantime, the local (or other) authorities can be contacted in order to trace and/or locate the person or system attempting to improperly access the system. If the terminal is a PC, where it may be desirable to prevent people from using number generation or similar routines to attempt to access funds, an employee or system can virtually visit the system or otherwise unlock the system via software or other appropriate techniques. As this downtime can be undesirable, it can be useful to provide a PIN number, password, or other element to go along with the voucher identifier, to minimize the need to lock the system.

In another embodiment, the user or recipient can be validated via a standalone validation station, which typically would not have an employee present. At such a station, a user or recipient can present information sufficient to validate the identity of the user. For example, a user could have a smart card including a biometric device (such as a fingerprint reader) that would allow the user to validate his or her identity using biometrics built into the smart card. The validation station itself could also contain a biometric or other identity-verifying device as known in the art. In another embodiment, the user might be able to input information such as a driver's license or passport along with information such as a social security number or other identifier as enough to validate the user. The process for identification can vary depending upon factors such as local, national, or other laws, rules, and/or regulations, as well as equipment available at that validation station. Any appropriate information, object, or element, or combination thereof, capable of authenticating the identity of the user can be used as would be understood to one of ordinary skill in the art in light of the specification.

Further, it might not be necessary for a recipient to physically visit a remote terminal as described above to return the voucher. In some embodiments a validated user or recipient, whether an individual, merchant, or organization, for example, can simply access a remote Web site or other remote interface allowing the information for the voucher to be entered and a service rendered. For example, a user might send a voucher to a company for payment on a transaction. The receiving company might be connected with the network, or might simply be able to access the network through a connection such as an Internet connection, allowing an employee or system of the company to access the financial network and input information relating to the voucher, such as the alphanumeric identifier or other indicia described elsewhere herein. The company may then be able to receive a transfer of funds, such as to an appropriate account, whereby it is not necessary for anyone to physically visit a remote terminal to receive the funds. As long as the initial user visits a remote terminal, and then is authenticated at a validation station, the funds or services available through the card may be accessed in any appropriate way as discussed and suggested herein.

In another embodiment, a user can transfer funds through the Internet or another appropriate network by sending information such as a voucher identifier and a password to a recipient. The recipient then can visit a remote terminal or validation station, as discussed above, and enter or present the information. If the recipient must be authenticated at a validation station, the recipient can be issued a new activated voucher or can receive the same voucher but activated for that recipient. The recipient can take an activated voucher or voucher identifier to any remote terminal or other appropriate network device to redeem the activated voucher, such as by receiving cash, an online or offline debit card, a credit card, or any other such object or service described herein at a remote terminal.

In embodiments where a recipient receives and uses just a voucher identifier, it can be necessary to have a user input data into the system in order to ensure that the system has the necessary data (as no one will be inserting the voucher into the system). In another embodiment, the user may have to insert the voucher into a remote terminal in order to ensure that the system has the necessary information, then can receive another voucher that the user and/or recipient can use simply by inputting the number. As laws may require that the system obtain information for the user, it can be necessary to collect the information at a remote terminal or validation station, either by receiving or inputting electronically or by taking physical possession of a filled-out voucher. If the system allows for acceptance of filled-out vouchers, then it can be necessary for the voucher to be filled out before validation, with the information matching the identified user.

Embodiments in accordance with the present invention can be implemented using control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention. Further, although exemplary circuitry and components are shown, it should be understood that there are a number of ways to achieve the objectives of the present invention utilizing the descriptions and teachings of the various embodiments herein that would be L obvious to one of ordinary skill in the art in light of the teachings herein.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A system for providing financial services, comprising:
    a remote terminal operable to accept a form of payment and a financial service request from a first user and issue a voucher in response thereto; and
    a validation station, at a location separate from the remote terminal, operable to authenticate an identity of the first user and activate the voucher when the identity is authenticated, the first user or a second user being able to use the activated voucher at the remote terminal to obtain the requested financial service, the first user or the second user further being able to use a voucher identifier associated with the activated voucher at the remote terminal to obtain the requested financial service, the requested financial service able to be obtained by the first user or the second user based on the authenticated identity of the first user at the time of activation of the voucher and independent of any additional identity verification of the first user or the second user.

2. A system according to claim 1, further comprising:
a data storage device in communication with at least one of the remote terminal and validation station and operable to store information corresponding to the voucher identifier.

3. A system according to claim 1, wherein:
the remote terminal associates a voucher identifier with the voucher before activation of the voucher.

4. A system according to claim 1, further comprising:
a second remote terminal operable to provide the requested financial service using at least one of the activated voucher and voucher identifier.

5. A system according to claim 1, wherein:
the remote terminal includes a payment acceptance device operable to allow the user to insert the form of payment.

6. A system according to claim 5, wherein:
the form of payment is selected from the group consisting of cash, checks, credit cards, ATM cards, online debit cards, offline debit cards, and smart cards.

7. A system according to claim 5, wherein:
the remote terminal is further operable to associate an amount of funding with the voucher, the amount of funding coming from the form of payment.

8. A system according to claim 1, wherein:
the remote terminal includes at least one input device selected from the group consisting of card readers, scanners, bar code readers, smart card readers, cameras, keyboards, keypads, pointers, touch screens, and biometric devices.

9. A system according to claim 1, wherein:
the validation station includes at least one input device selected from the group consisting of card readers, scanners, bar code readers, smart card readers, cameras, keyboards, keypads, pointers, touch screens, chip and PIN readers, and biometric devices.

10. A system according to claim 1, wherein:
the validation station is further operable to receive and store identification information for the first user when the first user is authenticated.

11. A system according to claim 1, wherein:
the activated voucher is different from the voucher issued by the remote terminal.

12. A method of providing financial services, comprising the steps of:
receiving from a first user at a first location a form of payment and an indication of a financial service to be provided;
issuing the first user a transaction voucher corresponding to the financial service;
authenticating the identity of the first user at a second location, different from the first location; and
activating the transaction voucher at the second location, the activated transaction voucher having associated therewith a voucher identifier, the first user or a second user able to use the activated voucher at the first location to obtain the requested financial service, the first user or the second user further being able to use the voucher identifier at the first location to obtain the financial service, the requested financial service being able to be obtained by the first user or the second user based on the authenticated identity of the first user at the time of activation of the transaction voucher and independent of any additional identity verification of the first user or the second user.

13. A method according to claim 12, further comprising:
receiving at least one of the activated voucher and voucher identifier for the activated transaction voucher at a third location; and
providing the financial service at the third location.

14. A method according to claim 12, wherein:
the financial service involves disbursing funds associated with the voucher.

15. A method according to claim 12, wherein:
the form of payment is selected from the group consisting of cash, checks, credit cards, ATM cards, online debit cards, offline debit cards, and smart cards.

16. A method according to claim 12, further comprising:
collecting and storing identification data for the first user when authenticated.

17. A method according to claim 13, further comprising:
collecting and storing the activated transaction voucher.

18. A method according to claim 17, wherein:
the collected transaction voucher includes identification information for the first user when authenticated.

19. A method of transferring funds from a user to a recipient, comprising the steps of:
receiving a source of funding and a financial service request from a first user at a first remote terminal;
issuing a voucher, corresponding to the source of funding and the financial service request, to the first user at the remote terminal, the voucher including a voucher identifier;
using the voucher identifier and the identity of the user to activate the voucher at a validation station at a separate location from the first remote terminal, the identity of the user being authenticated at the validation station;
receiving the voucher identifier from a recipient of the voucher at a second remote terminal at a separate location from the validation station; and
issuing funds associated with the voucher to the recipient, the funds being able to be obtained by the recipient based on the authenticated identity of the first user at the time of activation of the transaction voucher and independent of an identity verification of the recipient.

20. A method of providing financial services, comprising the steps of:
authenticating an identity of a first user at a first location;
issuing the authenticated first user a transaction voucher;
receiving from the first user at a second location a form of payment and an indication of a financial service to be provided, along with at least one of the voucher and a voucher identifier associated with the transaction voucher; and
activating the transaction voucher at the second location, the first user or a second user being able to use the activated transaction voucher at the first or second location to obtain the financial service, the first user or the second user further being able to use the voucher identifier at the first or second location to obtain the financial service, the financial service able to be obtained by the first user or the second user based on the authenticated identity of the first user at the time of activation of the voucher and independent of any additional identity verification of the first user or the second user.

21. A method according to claim 20, further comprising:
receiving at least one of the activated voucher and voucher identifier at a third location; and
providing the financial service at the third location.

22. A method of providing financial services, comprising the steps of:

receiving from a first user through a Web site a form of payment and an indication of a financial service to be provided;

issuing the first user a transaction voucher identifier corresponding to the financial service;

authenticating the identity of the first user at a first location separate from a remote location where the first user accessed the Web site;

presenting the authenticated first user with an activated transaction voucher at the first location, the activated transaction voucher having associated therewith a voucher identifier, the first user or a second user able to use the activated transaction voucher at a second location to obtain the requested financial service, the first user or the second user further being able to use the voucher identifier at the second location to obtain the financial service, the financial service able to be obtained by the first user or the second user based on the authenticated identity of the first user at the time of activation of the voucher and independent of any additional identity verification of the first user or the second user.

23. A method according to claim 22, further comprising:

allowing the authenticated first user to immediately obtain the financial service in lieu of receiving an activated voucher, wherein the presenting step only occurs for first users not immediately obtaining the financial service.

24. A method of providing financial services, comprising the steps of:

receiving from a first user through a Web site a form of payment, an indication of a financial service to be provided, and at least one form of identification;

authenticating the identity of the first user via the Web site using the at least one form of identification; and issuing the first user a transaction voucher identifier corresponding to the financial service, the first user or a second user able to use the transaction voucher identifier at a remote location to obtain the financial service, the financial service able to be obtained by the first user or the second user based on the authenticated identity of the first user at the time of issuing the voucher and independent of any additional identity verification of the first user or the second user.

25. A computer program product embedded in a computer-readable medium, comprising:

computer program code for receiving from a first user at least one of a transaction voucher and a transaction voucher identifier corresponding to a requested financial service;

computer program code for receiving an indication of authentication of an identity of the first user; and computer program code for issuing to the first user at least one of an activated transaction voucher and an activated voucher identifier allowing the first user or a second user to obtain the requested financial service at a remote location, the financial service able to be obtained by the first user or the second user based on the authenticated identity of the first user at the time of issuing the voucher and independent of any additional identity verification of the first user or the second user.

26. A method of providing financial services, comprising the steps of:

receiving a first voucher or a first voucher identifier corresponding to an amount of funding, the first voucher being activated upon identification of an identity of a first user obtaining the first voucher;

receiving a second voucher or a second voucher identifier, the second voucher being activated upon identification of an identity of a second user obtaining the first voucher;

transferring funds from the amount of funding to correspond to the second voucher and the second voucher identifier, whereby a third user is able to access the transferred funds using the second voucher, the third user further being able to access the transferred funds using the second voucher identifier, the transferred funds being able to be accessed by the third user based on the authenticated identity of the second user at the time of activation of the second voucher and independent of any additional identity verification of the third user.

27. A method according to claim 26, wherein:

at least two of the first, second, and third users are the same user.

* * * * *